United States Patent [19]

Hull et al.

[11] Patent Number: 4,757,591

[45] Date of Patent: Jul. 19, 1988

[54] SNAP RING REMOVAL TOOL AND METHOD OF USING SAME

[76] Inventors: Norman P. Hull; Norman D. Hull, both of 479 S. Dudley St., Lakewood, Colo. 80226

[21] Appl. No.: 928,836

[22] Filed: Nov. 10, 1986

[51] Int. Cl.[4] .............................................. B23P 19/04

[52] U.S. Cl. ...................................... 29/426.6; 29/229; 29/235; 29/249

[58] Field of Search ................. 29/229, 249, 235, 451, 29/453, 270, 426.6; 81/124.7, 437, 53.2, 302, 385, 393, 8.1

[56] References Cited

U.S. PATENT DOCUMENTS 2,669,772 2/1954 Hamler .................................. 29/229

4,433,462 2/1984 Thomas ................................. 29/229

*Primary Examiner*—Timothy V. Eley

*Attorney, Agent, or Firm*—Edwin L. Spangler, Jr.

[57] ABSTRACT

This invention relates to an internal snap ring removal tool which is characterized by a first cylindrically-surfaced clamp-forming element clampable onto a surface of the snap ring exposed outside its groove while the cylindrical surface of the aforesaid element lies in essentially tangent relation to the bore of the part containing the snap ring, and an eccentrically-bored collar that encircles the clamp-forming element for relative rotation therearound in contact with the bore of the part housing the snap ring thereby camming the snap ring free of its groove. The invention also relates to the method of using such a tool for removing snap rings which includes the steps of clamping the cylindrically-surfaced clamping tool onto a portion of the snap ring exposed outside its groove while holding the surface of the tool tangent to the bore of the part housing the ring, placing an eccentrically-bored collar around the clamping tool and rotating the latter around the cylindrical clamping tool surface without turning it so as the cam the ring free of its groove.

9 Claims, 1 Drawing Sheet

SNAP RING REMOVAL TOOL AND METHOD OF USING SAME

BACKGROUND OF THE INVENTION

Hardened steel snap rings are commonly used in industry to retain parts within a cylindrical bore. They are of uniform thickness but of varying width, the medial portion being somewhat thinner than the ends where the much wider apertured lugs are located. Plier-like tools having blunted tines on the jaw ends are used to insert and remove the rings from within the internal annular grooves provided therefor in the bore. This is a simple operation provided that the lugs are intact, however, it is not at all uncommon to have all or portions thereof break off in which event the plier-like tool becomes totally ineffective to remove them. If only one lug is missing, the problem is not too serious since, oftentimes, one can still pry the end that still has the lug free of its groove far enough to get something in behind it and thereby effect its removal. As a matter of fact, single-pinned tools for prying the good end free are available for just this situation.

The real problem arises when both lugs are missing or at least so much of them that the usual removal tools have nothing to grab onto. Actually, the problem can be further subdivided into those situations where there is a space left beneath the ring and those where there is none, the latter being the most difficult of all to cope with. In our copending application Ser. No. 928,829, we disclose a set of snap ring removal tools together with the method of using same that are especially adapted for use in the situation where the snap ring cannot be accessed from underneath. This, application, on the other hand, deals with the somewhat simpler situation in which there is a space left between the ring and the endplate of the retained part.

FIELD OF THE INVENTION

Accordingly, the present invention deals with the removal of broken or lugless snap rings in those applications where the underside of the ring is accessible.

It is a principal object of the invention to provide a tool for removing lugless rings in this situation.

A second objective is that of providing a unique method of removing such rings using the special tool forming the subject matter hereof.

Another object of the invention herein disclosed and claimed is to provide a way of getting broken snap rings out of their grooves without damaging either the groove or the part containing the latter.

Still another objective is the provision of a tool of the class described which will work with an apertured lug but can effectively remove a ring that has none.

Further objects are to provide a snap ring removal tool which is compact, rugged, versatile, easy to use, readily adaptable to different size rings and even somewhat decorative.

Other objects will be pointed out specifically hereinafter as the detailed description of the invention proceeds.

DESCRIPTION OF THE RELATED ART

There are, of course, a great number of fastener removal tools of various types such as, for example, those forming the subject matter of U.S. Pat. Nos. 4,084,454; 4,416,045; and 4,475,276; however, these tools deal with fasteners that are essentially in tact. Others like the broken screw extractor forming the subject matter of U.S. Pat. 3,106,233 deal with the problem encountered when the fastener is damaged in some way.

Snap rings present a particular problem both for insertion and removal even when intact because they are made of hardened essentially undrillable steel, they are very difficult to spring open or closed for insertion into the groove and, all too often, they are largely inaccessible. There are a multiplicity of special tools for working with snap rings, some being plier-like such as those disclosed in U.S. Pat. Nos. 2,474,222; 2,483,383; 2,510,206; 2,518,142; and 3,762,020, all of which incorporate some type of jaw-action to pry the ends of the ring open or closed. Those intended for use with internal snap rings as opposed to external ones all seem to require that at least one apertured lug, and usually both, be available to receive the tines on the jaws. This is true, evidently, of even those bladed prying tools like those shown in U.S. Pat. Nos. 2,669,772 and 4,175,310. On the other hand, certain of the tools shown in U.S. Pat. No. 4,433,462 do not appear to require the presence of an apertured lug in all instances. Other snap ring removal tools like that forming the subject matter of U.S. Pat. No. 3,483,606 are not plier-like nor do they constitute prying tools but instead are designed around concentric sleeves each of which carries a tine for insertion in the lug aperture.

None of the aforementioned prior art patents shows a tool for clamping onto the broken lug of an internal snap ring where there is no apertured lug available which is a feature of our removal tool. There are prior art patents which employ the principle of an eccentrically-pinned tool to pry the ring from its groove. Representative of this type of tool are those shown in U.S. Pat. Nos. 4,175,310 and 4,514,889 which constitute the closest prior art known to applicants.

SUMMARY OF THE INVENTION

The present invention consists primarily of an eccentric clamping tool which has as its function that of initially grabbing onto one end of the broken ring whereupon it, together with a pair of supplementary tools, permit the user to pry the ring from its groove. The clamping tool is slotted to receive an exposed portion of the ring at which point a pin is actuated into extended position where it enters the slot and, in so doing, clamps the aforementioned portion therein. Once the ring is securely held in the slot, an eccentric surface on the body of the tool is rotated to cam the clamped portion free of the groove in which it was housed.

The first of the supplementary tools is one which is used to slip in behind the freed portion of the ring and pry it far enough out so that a lifting tool can be inserted therebehind. With the prying tool in place and actuated in the manner just mentioned, the notched lifting tool can be brought into play to lift the ring from its groove.

The invention also encompasses the novel method of removing the ring comprising the steps of clamping onto an exposed portion thereof, camming the exposed portion free of the groove and then lifting the portion thus freed to free the rest.

DESCRIPTION OF THE PREFERRED EMBODIMENTS

Figure 1:
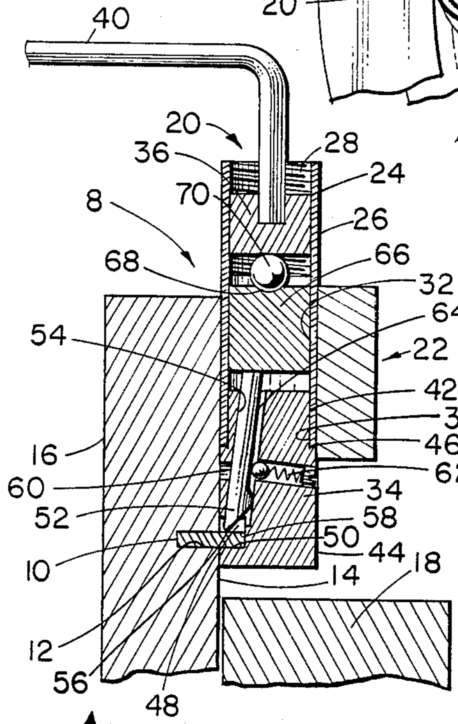
FIG. 1 is fragmentary elevational view, portions of which have been broken away and shown in diametrical section showing the eccentric clamping tool in clamped position on an exposed portion of the snap ring.

Referring next to the drawings for a detailed description of the present invention and, initially, to FIG. 1 for this purpose, reference numeral 8 has been chosen to broadly designate the eccentric-bodied clamping tool of the present invention which will be seen clamped onto an exposed portion of a broken snap ring 10, the remainder of which lies seated in its groove 12 provided therefor in the bore 14 of cylindrical part 16. In the particular form shown, the endplate 18 retained in the bore 14 by the ring lies spaced beneath the latter a distance that permits access to the underside thereof. Actually, clamping tool 8 can best be understood by further subdividing it into the ring-gripping part and the eccentrically-bored collar encircling the latter which have been referred to in a general way by reference numerals 20 and 22, respectively.

The ring-gripping part 20 of the tool 8 can be seen to include a cylindrical body 24 made up of a tubular portion 26 internally-threaded at both its upper end 28 and its lower end 30 to leave a smooth-bored portion 32 therebetween. A notched plug 34 screws into the lower end of the tube 26 while an axially-movable plug 36 screws into its upper end. Plug 36 has a hexagonal kerf 38 centered in its upper end for the reception of an Allen wrench 40 which is used to advance and retract it. Plug 34, on the other hand, has a threaded section 42 and a cylindrical portion 44 separated from one another by an annular abutment 46. Cylindrical portion 44 defines a continuation of the cylindrical surface of the body 24 while the annular abutment forms a stop limiting its penetration into the latter.

Cylindrical portion 44 of the plug 34 is transversely notched as seen at 48 to receive the exposed portion of the broken snap ring 10. This notch defines an upwardly-facing supporting surface or anvil 50 atop which the underside of the snap ring rests while it is clamped therein by pin 52. This pin 52 is housed inside the plug 34 within a downwardly and outwardly inclined bore 54 which opens into the notch at a point essentially tangent to cylindrical portion 44. This means, of course, that with the pin in its fully-extended position, its pointed end 56 will project just slightly beyond the aforesaid cylindrical surface, the purpose for this being one of gripping the ring as far away from its inside edge 58 as possible. Due, however, to the thickness of the ring, the actual point at which the pin engages the ring is, for all practical purposes, adjacent the bore 14 of the cylindrical part 16 containing the snap ring groove 12.

Intersecting bore 54 housing the pin 52 just above notch 48 is a bore 60 into which is inserted a spring-biased ball-nose plunger subassembly 62. A flat 64 on pin 52 is contacted by the ball of this subassembly which prevents it from rotating in its bore 54 so that the pointed end 56 thereof always remains right at the entrance to the notch 48. An important additional function of subassembly 62 is that of holding the pin up in retracted position spaced above the anvil 50 a distance which will permit the ring 10 to enter same. While the pin is not biased into retracted position by subassembly 62, it is a simple matter to raise it manually preparatory to starting the ring removal operation so long as the plug 36 is retracted.

With the tool 8 positioned as shown in FIG. 1, the initial step in the method for removing the snap ring 10 is that of extending pin 52 down until it digs into the upwardly-facing surface of the ring. Mounted for free-sliding movement in the smooth-surfaced medial section 32 of tubular member 26 is housed still another plug 66 which, while free to rotate, usually moves only axially. Its lower end bears against the top of pin 52 as shown while its upper end contains a centrally-located dimple 68 which seats ball 70. The lower end of plug 36 bears against the top of the ball. The axially-directed force developed when plug 36 is screwed down into the internally-threaded upper end of tubular member 26 is transferred through ball 70 to the plug 66 and thence to the pin 52 causing the latter to dig into the ring and press it down against the anvil 50 defined by the upwardly-facing surface of the notch. Movement of plug 36 is accomplished as shown in FIG. 1 by inserting Allen wrench 40 into the hexagonal kerf 38 and turning it.

With the ring tightly secured within the notch in the ring-gripping portion 20 of the tool as shown in FIG. 1, the next step in the operation is to pry the ring from its groove 12 and for a detailed description of this operation reference will now be made to FIG. 2. Collar 22 is cylindrical and of substantially greater diameter than the latter so as to receive same for relative rotational movement within its eccentric bore 72. In the particular form shown in FIG. 3, it will be seen that bore 72 actually intersects the cylindrical surface of the collar so as to leave a narrow vertically-extending slot 74 within which the corresponding cylindrical surface of the ring-gripping portion of the tool is exposed. The reason for this is in order to permit the ring-gripping portion of the tool to lie tangent to the bore 14 of grooved member 16 while the ring is being engaged and clamped.

Figure 3:
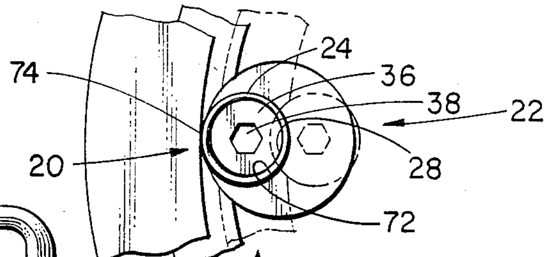
FIG. 3 is a fragmentary top plan view showing the elements of the assembly in the same relation as seen in FIG. 1.
Figure 2:
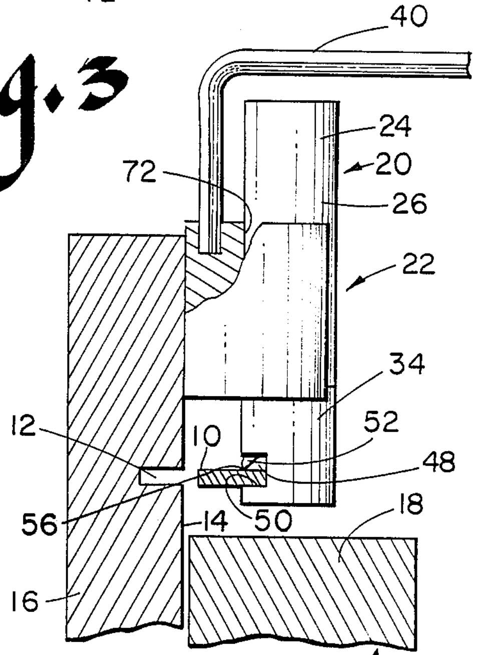
FIG. 2 is a fragmentary elevational view similar to FIG. 1 and to the same scale but differing therefrom in the fact that the eccentric sleeve encircling the tool has been rotated a half turn thus camming the clamped portion of the ring free of its groove.

Directing particular attention to FIGS. 2 and 3, it will be seen that the upper end of the collar 22 in the particular form shown is also provided with a hexagonal kerf 38 to receive the Allen wrench 40. Other arrangements well known in the art capable of being used to turn collar 22 can easily be substituted for the kerf 38. The next step is, of course, to remove wrench 40 from the kerf in the gripping tool and reposition it in kerf in the collar where it is used to rotate the latter a half turn into the phantom line position shown in FIG. 3 and the full line position shown in FIG. 2. While this is taking place, the ring-gripping portion 20 of the tool is held against rotation by virtue of the fact that it is tightly fastened to the ring 10. Thus, rotation of collar 22 results in it camming the ring-gripping portion 20 together with the ring held therein out of the groove into the position shown in FIG. 2.

Figure 4:
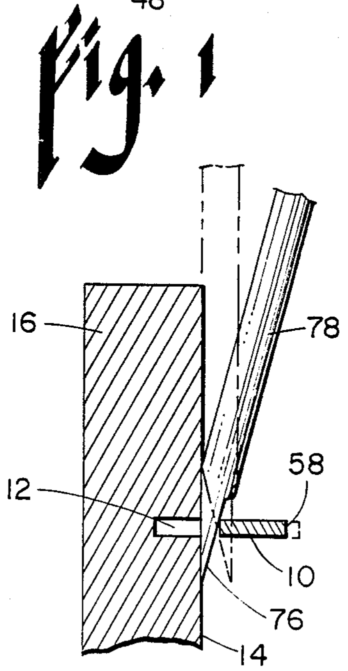
FIG. 4 is another fragmentary elevational view much like FIGS. 1 and 2 except that the clamping tool has been removed and the prying tool put in its place and actuated to create enough of the gap therebehind to receive the lifting tool; and, FIG. 5 is yet another fragmentary elevational view where the lifting tool has replaced the prying tool.
Figure 5:
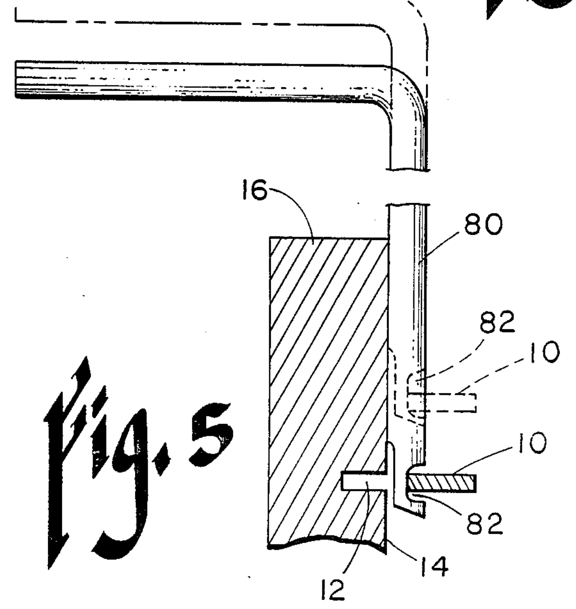

At this point the worst is over and it only remains to remove the rest of the ring from the groove. In FIG. 4, it will be seen that the generally V-shaped blade 76 of a simple prying tool 78 is inserted behind the ring in the gap produced between it and the bore 14 preparatory to rocking it from its full line position into its phantom line position which is effective to pry the ring even farther out of its groove into a position where the lifting tool 80 of FIG. 5 can be placed in behind it as seen in FIG. 5. The final step in the removal operation is that of moving the prying tool 78 around the ring ahead of a lifting tool 80 not unlike the notched tool shown in FIG. 2 of U.S. Pat. No. 4,433,462. As the ring is pried free of its groove, the notched end 82 of the lifting tool is used to raise the ring from its full line position of FIG. 5 into the phantom line position shown therein where eventually it can be removed altogether.

It is significant to note that all during this ring removal sequence, nothing has taken place which would damage the groove 12 or the part 16 containing same. The same is true of the endplate 18 which can now be disassembled from part 16 but has remained undamaged throughout the process.

What is claimed is:

1. An extracting tool for removing snap rings from an internal annular groove contained within the bore of a workplace which comprises: means including a cylindrical outer surface for detachably clamping onto a surface of a snap ring exposed outside the groove housing same, means for camming the ring thus clamped out of the groove comprising a collar having a bore sized to receive the cylindrical surface of the clamping means for relative rotational movement therearound and a cam surface bordering the latter, said cam surface being shaped and adapted upon rotation thereof to push said collar away from the workpiece bore, and means for rotating the cam surface of said collar against the bore of the workpiece without turning the clamping means so as to pull the latter together with the ring clamped therein away from the slot.

2. The snap ring extraction tool as set forth in claim 1 in which: the means for detachably clamping onto the snap ring surface includes a notch sized to receive the aforesaid surface defining an upwardly-facing platform for supporting same, a pin mounted in said clamping means for movement relative thereto between a retracted position leaving the notch open to receive the snap ring and an extended position projecting into said notch, and plug-forming means threadedly mounted within said clamping means for movement against said pin, said plug-forming means being operative upon actuation to drive said pin into extended position thereby clamping a snap ring housed in the notch in fixed position against said supporting surface.

3. The snap ring extraction tool as set forth in claim 2 in which: means comprising a spring-biased ball-nose plunger is housed in the clamping means positioned and adapted to engage the pin and releaseably retains same in retracted position to receive the snap ring.

4. The snap ring extraction tool as set forth in claim 3 in which: the pin includes a pointed end on the end thereof that projects into the notch when extended, and the pin is mounted such that said pointed end in extended position is substantially tangent to the cylindric surface of the clamp-forming means.

5. The snap ring extraction tool as set forth in claim 4 in which: the pin includes a flat positioned to receive the spring-biased ball-nose plunger, said flat and ball-nose plunger cooperating to prevent relative rotation of the pin within the clamp-forming means.

6. The snap ring extraction tool as set forth in claim 2 in which: the plug-forming means comprises a subassembly including a threaded plug, a ball and a smooth-surfaced plug, opposed surfaces of said threaded and smooth-surfaced plugs carrying indentations positioned and adapted to retain said ball centered therebetween, and said ball when thus positoned functioning as a bearing against which the threaded plug turns while the smooth-surfaced plug remains substantially free of rotational movement as it is driven axially against the pin.

7. The snap ring extraction tool as set forth in claim 1 in which: the cam-forming collar is cylindrical.

8. The snap ring extraction tool as set forth in claim 7 in which: the cylindrical bore intersects the cylindrical surface of the collar to leave the cylindrical surface of the clamp-forming means exposed in substantially tangent relation to said cylindrical surface of the collar.

9. The method of removing a snap ring from an internal groove contained within a cylindrical bore which comprises: clamping a cylindrically-surfaced tool onto an exposed portion of the snap ring such that the tool surface is substantially tangent to the grooved bore, placing the cylindrical surface of the tool within an eccentrically-positioned bore sized to receive same that lies essentially tangent to the cylindrical surface cam-forming surface of a larger diameter collar, and rotating said collar cam-forming surface against the grooved bore around the tool without turning the latter so as to cam and lift the ring free of its groove.

* * * * *